Patented Aug. 2, 1927.

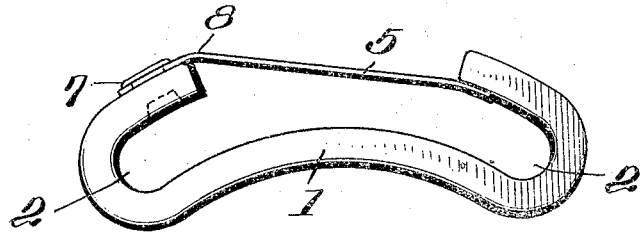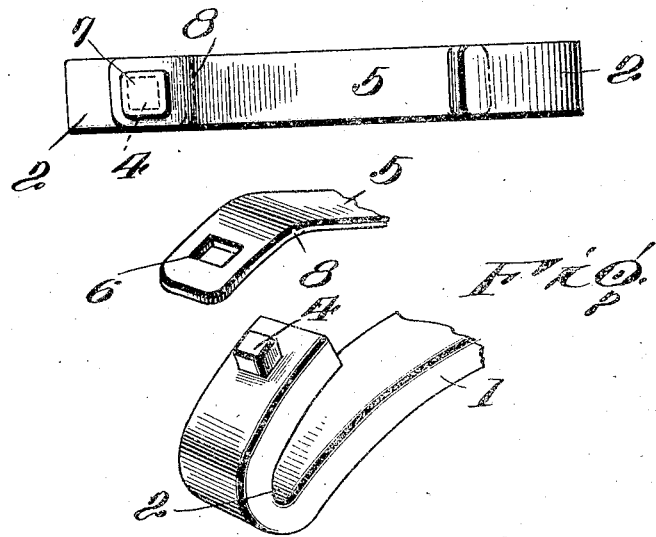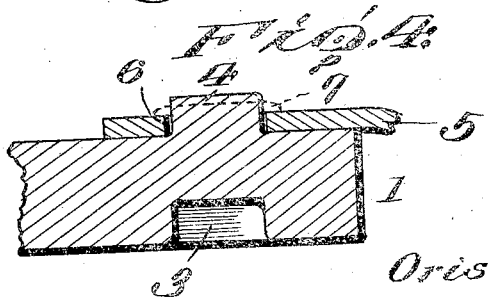

1,637,860

UNITED STATES PATENT OFFICE.

ORIS C. HILL, OF PAWTUCKET, RHODE ISLAND.

SNAP LINK.

Application filed April 5, 1927. Serial No. 181,041.

This invention is a fastening link for connecting the ends of chains and is intended more particularly for use in connection with skid-preventing tire chains, the object being to provide a cheap but efficient device which may be easily applied to or released from the ends of the chain.

The invention is illustrated in the accompanying drawing and consists in certain novel features specifically defined in the claims.

In the drawing:

Fig. 1 is a side view of a link embodying the invention;

Fig. 2 is a plan view of the same;

Fig. 3 is a detail perspective view showing the construction for mounting the spring tongue; and Fig. 4 is a detail section.

The body of the device consists of a metallic strap of suitable dimensions having its intermediate portion arched, as shown at 1, and its ends doubled on themselves to form similar hooks 2, the hooks being engageable in the end links of the cross tire chains and the arched portion conforming the device to the curvature of the tire. One extremity of the strap is subjected to pressure in a former whereby a portion of the material, represented by the socket 3, is displaced laterally to form a lug 4 projecting from the outer side of the device, the lug being non-circular in outline, as shown clearly in Figs. 2 and 3. A spring tongue 5 is arranged to extend across and close the space between the bills of the hooks 2, said tongue being provided at one end with an opening 6 whereby it may be fitted over the lug 4 and having its opposite free end disposed to bear against the inner side of the bill of the cooperating hook 2. After the tongue has been engaged over the lug 4, the end of the lug is upset, as indicated at 7, so that the tongue cannot be detached, and it will be understood that the non-circular formation of the lug and of the opening in which it is engaged prevents lateral movement of the tongue so that the latter is maintained in alinement with the hooks. It will be noted that the tongue is bent slightly, as at 8, to accommodate the angular relation of the engaged surfaces and that its resiliency holds its free end against the adjacent hook in closed position.

In use, the end of a chain link is engaged over a hook 2, the tongue yielding to permit the insertion of the link end and immediately returning to closed position as it clears the link end. When the link is to be released, pressure is applied to the tongue by the fingers of the user to move its free end to open position, whereupon the chain link may be withdrawn.

What I claim as new and desire to secure by Letters Patent of the United States is:

1. A fastening link comprising an open body having hooks at its ends and provided with a non-circular lug on the outer side of one hook, and a spring tongue provided at one end with a non-circular opening engaged with said lug and having its free end arranged to bear against the inner side of the other hook, said lug being integral with and formed from displaced material of the hook.

2. A fastening link comprising an open body having hooks at its ends and provided with a lug on the outer side of one hook, and a spring tongue provided at one end of an opening engaged with said lug and having its free end arranged to bear against the inner side of the other hook, said lug being integral with and formed from displaced material of the hook.

In testimony whereof I hereunto affix my signature.

ORIS C. HILL.